United States Patent
Yoshimura et al.

(10) Patent No.: US 11,864,011 B2
(45) Date of Patent: Jan. 2, 2024

(54) QUALITY ESTIMATION SYSTEM, QUALITY ESTIMATION METHOD AND PROGRAM

(71) Applicant: NIPPON TELEGRAPH AND TELEPHONE CORPORATION, Tokyo (JP)

(72) Inventors: Noriko Yoshimura, Musashino (JP); Noritsugu Egi, Musashino (JP); Jun Okamoto, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 325 days.

(21) Appl. No.: 17/419,399

(22) PCT Filed: Dec. 23, 2019

(86) PCT No.: PCT/JP2019/050379
§ 371 (c)(1),
(2) Date: Jun. 29, 2021

(87) PCT Pub. No.: WO2020/141590
PCT Pub. Date: Jul. 9, 2020

(65) Prior Publication Data
US 2022/0070703 A1    Mar. 3, 2022

(30) Foreign Application Priority Data
Jan. 4, 2019   (JP) ................. 2019-000295

(51) Int. Cl.
*H04W 24/08*   (2009.01)
*H04W 64/00*   (2009.01)
(52) U.S. Cl.
CPC ........... *H04W 24/08* (2013.01); *H04W 64/00* (2013.01)

(58) Field of Classification Search
CPC .............................. H04W 64/00; H04W 24/08
See application file for complete search history.

(56) References Cited

U.S. PATENT DOCUMENTS

| 2009/0003236 A1* | 1/2009 | Aoyama | H04L 1/20 370/253 |
| 2015/0312796 A1* | 10/2015 | Shikida | H04W 24/08 370/252 |

(Continued)

OTHER PUBLICATIONS

Noriko Yoshimura et al, "Proposal of throughput estimation model using radio parameters and RTT", 2018 IEICE General Conference, B-11-12, Mar. 20, 2018.

(Continued)

*Primary Examiner* — Ajay Cattungal
(74) *Attorney, Agent, or Firm* — IPUSA, PLLC

(57) ABSTRACT

A quality estimation system for estimating DL throughput at user terminals which are connected to a wireless network, includes: acquisition means for acquiring at least terminal information, wireless reception quality information and network quality information from a plurality of user terminals; coefficient derivation means for deriving coefficients in an estimation equation in which the DL throughput is an objective variable and at least the wireless reception quality information and the network quality information are explanatory variables, based on the information acquired by the acquisition means; and estimation means for estimating DL throughput corresponding to measurement data from the measurement data using the estimation equation with application of the coefficients.

5 Claims, 13 Drawing Sheets

(56) References Cited

U.S. PATENT DOCUMENTS

| | | | | |
|---|---|---|---|---|
| 2016/0072898 | A1* | 3/2016 | Fallon | H04L 47/22 |
| | | | | 455/414.1 |
| 2016/0198364 | A1* | 7/2016 | Schwarzbauer | H04W 36/14 |
| | | | | 370/331 |
| 2017/0064489 | A1* | 3/2017 | Tanida | H04W 4/70 |
| 2017/0374167 | A1* | 12/2017 | Takeshita | H04L 67/535 |
| 2019/0253961 | A1* | 8/2019 | Bouvet | H04W 36/30 |
| 2019/0363856 | A1* | 11/2019 | Su | H04W 72/04 |
| 2021/0219154 | A1* | 7/2021 | Han | H04B 7/0626 |
| 2022/0264440 | A1* | 8/2022 | Iwai | H04L 45/85 |

OTHER PUBLICATIONS

Joe Cainey et al, "Modelling Download Throughput of LTE Networks", 10th IEEE International Workshop on Performance and Management of Wireless and Mobile Networks (P2MNET 2014), pp. 623-628, Sep. 8, 2014.

Noriko Yoshimura et al, "A Study of Throughput Estimation Model for CA Compatible Models", 2018 IEICE Society Conference Proceedings 2, Sep. 11, 2018.

* cited by examiner

| QUALITY INFORMATION | ACQUISITION ITEMS | | | |
|---|---|---|---|---|
| TERMINAL INFORMATION | DATE/TIME OF ACQUISITION | MODEL | | |
| WIRELESS RECEPTION QUALITY INFORMATION | DATE/TIME OF ACQUISITION | RSRP | RSRQ | RSSNR |
| NW QUALITY INFORMATION | DATE/TIME OF ACQUISITION | RTT | DL THROUGHPUT | |

Fig. 6

| QUALITY INFORMATION | ACQUISITION ITEMS ||||
|---|---|---|---|---|
| BASE STATION INFORMATION | DATE/TIME OF ACQUISITION | LATITUDE/ LONGITUDE | TRANSMISSION SCHEME (CA, QAM, MIMO, ETC.) | ... |

QUALITY ESTIMATION SYSTEM, QUALITY ESTIMATION METHOD AND PROGRAM

TECHNICAL FIELD

The present invention relates to a technique for collecting quality information in a wireless network and estimating DL throughput from the collected quality information.

BACKGROUND ART

Conventional techniques for collecting quality information and estimating DL (Down Link) throughput from the collected quality information include a technique that estimates DL throughput by utilizing wireless reception quality parameters (RSRP, RSRQ, SINR) which are measured by instruments as input parameters, for example.

Further, techniques disclosed in Non-Patent Literatures 1 and 2 are also conventional techniques for collecting quality information and estimating DL throughput from the collected quality information.

CITATION LIST

Non-Patent Literature

Non-Patent Literature 1: 201803 IEICE General Conference, Proposal of throughput estimation model using wireless parameters and RTT, Yoshimura, B-11-12

Non-Patent Literature 2: Modelling Download Throughput of LTE Networks, Joe Cainey, Brendan Gill, Samuel Johnston, James Robinson, Sam Westwood, 39th Annual IEEE Conference on Local Computer Networks Workshops

SUMMARY OF THE INVENTION

Technical Problem

The first conventional technique mentioned above is not of a model intended for crowd sourcing (i.e., soliciting and collecting contributions from many unspecified users as terminal information) because it estimates the throughput using wireless reception quality parameters (RSRP, RSRQ, SINR) collected by instruments as input values.

The conventional technique disclosed in Non-Patent Literature 1 estimates the DL throughput using wireless reception quality parameters (RSRP, RSRQ, RSSNR) and RTT measured at user terminals, but it does not take into account the model characteristics of terminals, which particularly affect quality. Also, the conventional technique disclosed in Non-Patent Literature 2 is of a model for limited carriers.

Further, data transmission speed varies from model to model even in the same wireless reception environment or network environment due to difference in techniques for bundling multiple frequencies during reception (carrier aggregation or CA) or modulation schemes (64 QAM, 256 QAM, etc.), and difference in the transmission schemes supported by the respective models such as the number of simultaneous transmission/reception antennas (2×2 MIMO, 4×4 MIMO, etc.). Thus, taking terminal characteristics into consideration is important in estimation of DL throughput. However, as the conventional techniques do not take terminal characteristics into account, they have not achieved sufficient accuracy.

In view of these respects, the present invention is aimed at providing a technique that enables accurate computation of DL throughput based on quality information collected through crowd sourcing in a mobile network.

Means for Solving the Problem

According to the disclosed technique, a quality estimation system for estimating DL throughput at user terminals which are connected to a wireless network is provided. The quality estimation system includes:

acquisition means for acquiring at least terminal information, wireless reception quality information and network quality information from a plurality of user terminals;

coefficient derivation means for deriving coefficients in an estimation equation in which the DL throughput is an objective variable and at least the wireless reception quality information and the network quality information are explanatory variables, based on the information acquired by the acquisition means; and estimation means for estimating DL throughput corresponding to measurement data from the measurement data using the estimation equation with application of the coefficients.

Effects of the Invention

According to the present disclosure, a technique that enables accurate computation of DL throughput based on quality information collected through crowd sourcing in a mobile network is provided.

BRIEF DESCRIPTION OF DRAWINGS

FIG. 6 shows an example of information acquired by base stations 200.

DESCRIPTION OF EMBODIMENTS

An embodiment of the present invention is now described with reference to the drawings. The embodiment described below is merely an example and embodiments to which the present invention can be applied are not limited to the following embodiment.

For example, while the description below refers to LTE as a communication scheme, this is an example and the present invention is also applicable with 3G or 5G.

Overall Configuration of the System

Figure 1:
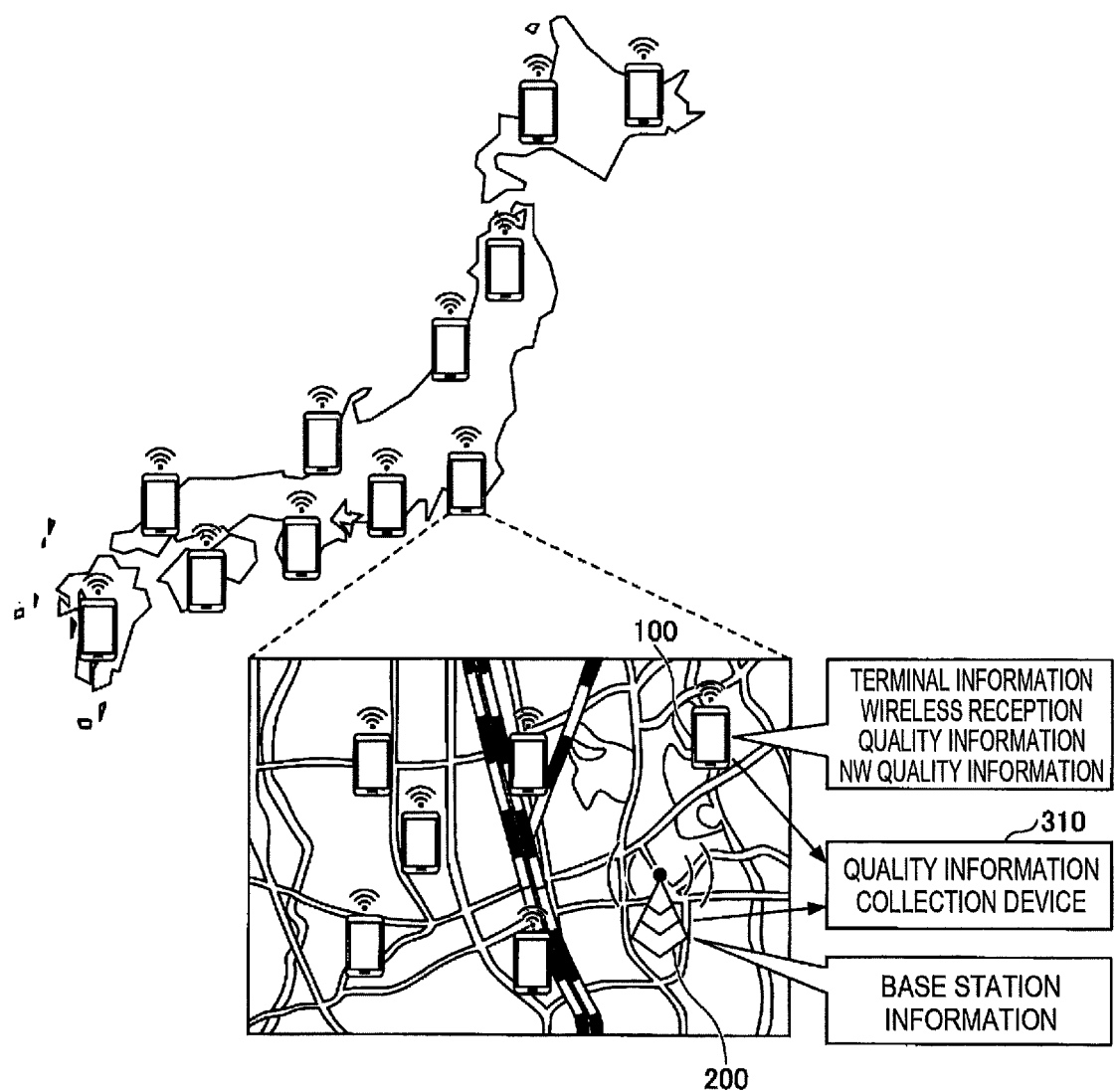
FIG. 1 shows an example of a target range in an embodiment of the present invention.

In this embodiment, as shown in FIG. 1, a quality information collection device 310 collects various kinds of quality information through crowd sourcing from many user terminals 100 which are connected to mobile networks and also collects base station information from many base stations 200. Then, DL throughput is estimated from the collected information. Although performance of information collection across Japan is depicted in the example shown in FIG. 1, this is an example and not limitative. For example, the target may be a foreign country, the entire world, or a partial region of Japan.

Figure 2:
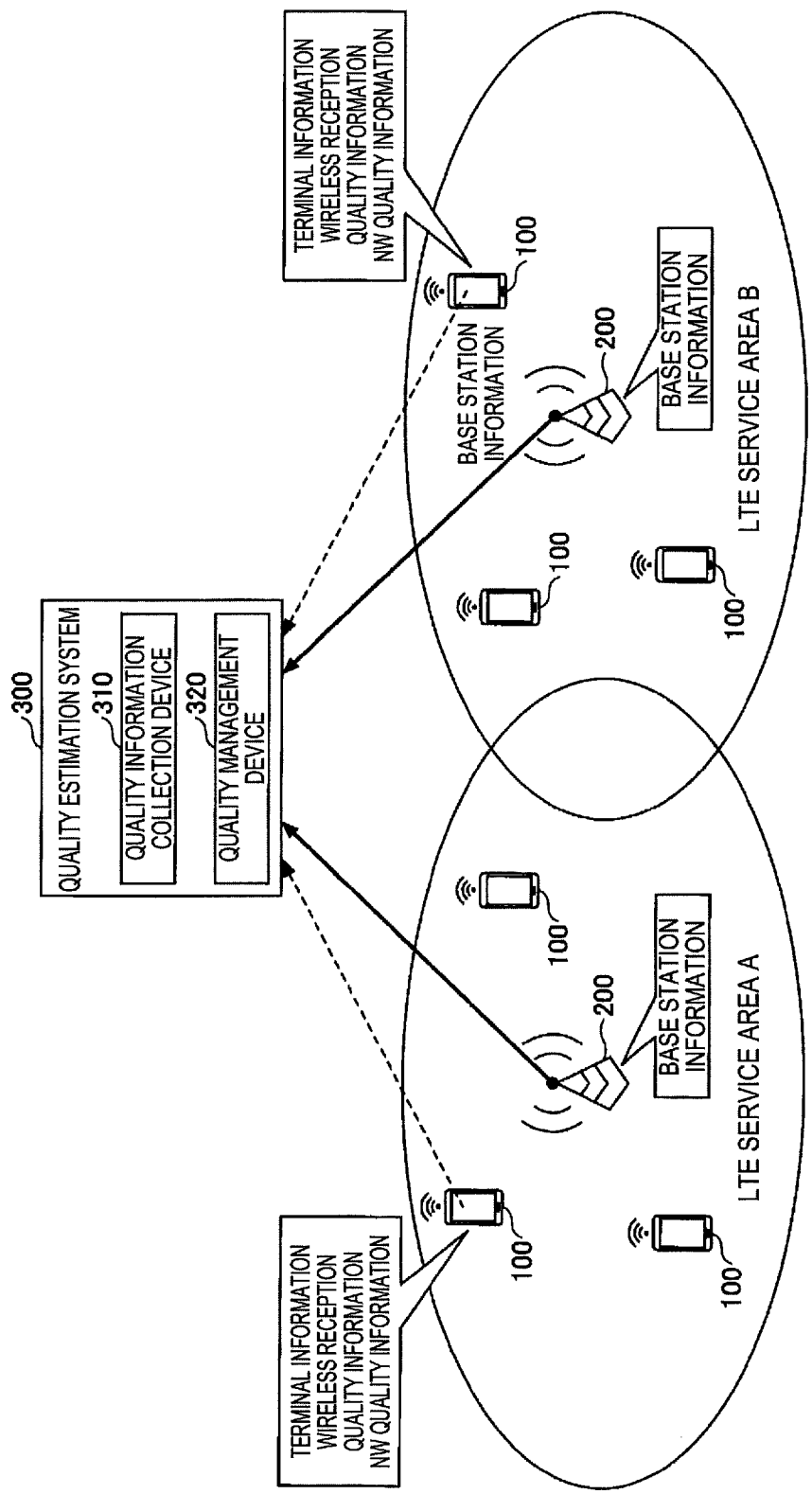
FIG. 2 shows an overall configuration of a system in the embodiment of the present invention.

FIG. 2 shows an overall configuration of a system. In FIG. 2, LTE service area A and LTE service area B are shown as an example. As shown in FIG. 2, a quality estimation system 300 including the quality information collection device 310 mentioned above and a quality management device 320 is provided.

The quality estimation system 300 may be provided in a core network of a mobile network or in a network outside the mobile network (e.g., the Internet). Also, a certain base station may have the functions of the quality estimation system 300 or a certain user terminal may have the functions of the quality estimation system 300.

The quality information collection device 310 collects terminal information, wireless reception quality information, and NW quality information from user terminals 100 present in the respective LTE service areas and collects base station information from the base stations 200. The quality management device 320 estimates the DL throughputs at the user terminals 100 based on the collected information.

Configurations of User Terminal 100 and Base Station 200 and General Operation

Figure 3:
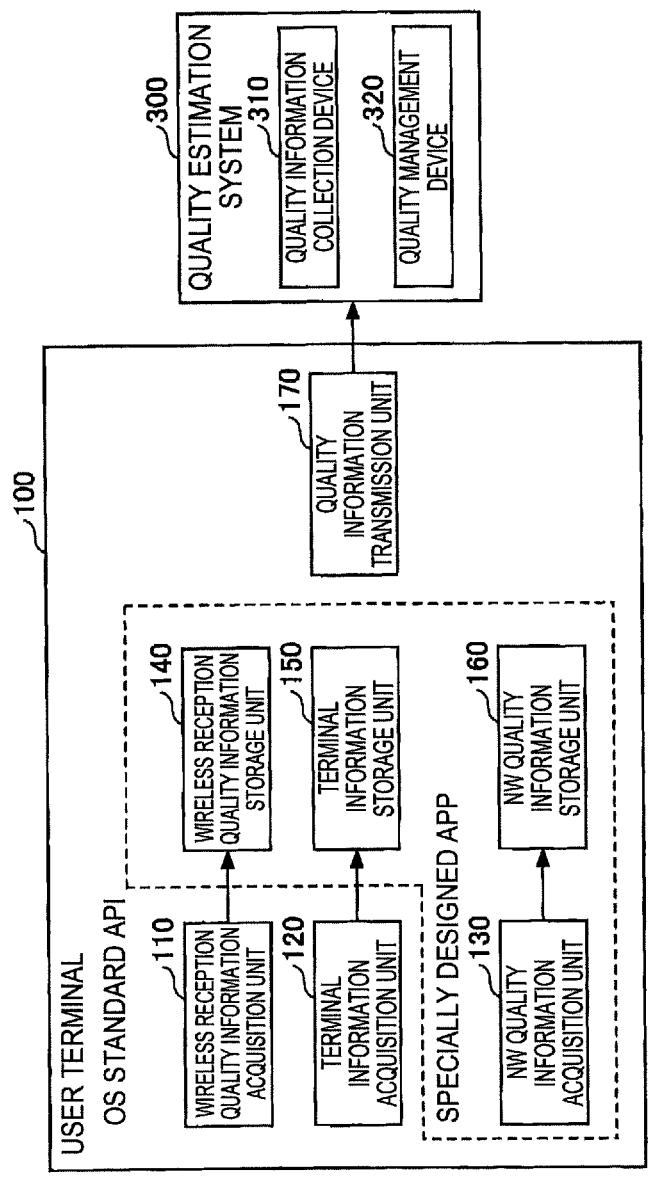
FIG. 3 is a block diagram of a user terminal 100.
Figures 4, 5:
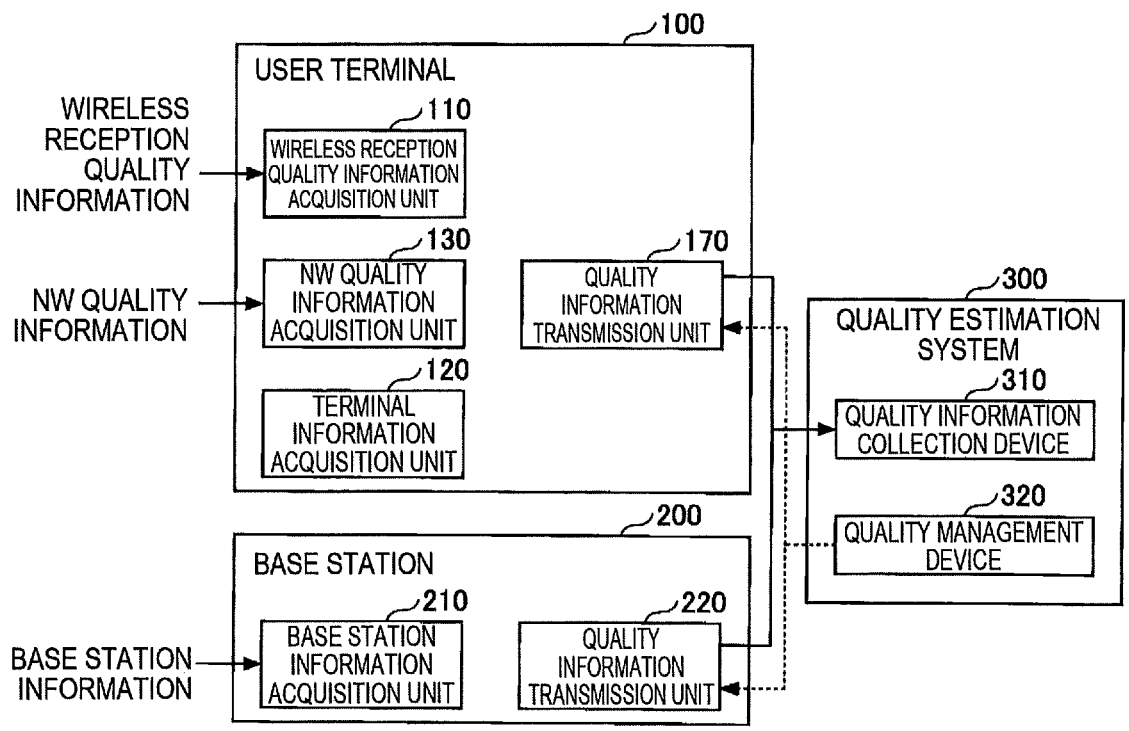
FIG. 4 shows an example of information acquired by user terminals 100.
FIG. 5 shows configurations of the user terminal 100 and a base station 200.

FIG. 3 is a block diagram of the user terminal 100. As shown in FIG. 3, the user terminal 100 includes a wireless reception quality information acquisition unit 110, a terminal information acquisition unit 120, an NW quality information acquisition unit 130, a wireless reception quality information storage unit 140, a terminal information storage unit 150, an NW quality information storage unit 160, and a quality information transmission unit 170. FIG. 4 shows types of quality information and acquisition items.

The wireless reception quality information acquisition unit 110 shown in FIG. 3 acquires RSRP (Reference Signal Received Power), RSRQ (Reference Signal Received Quality), RSSNR (Reference Signal Signal to Noise Ratio) and the like as wireless reception quality information. The acquired wireless reception quality information is stored in the wireless reception quality information storage unit 140 with addition of the date and time of acquisition (the date and time they were acquired).

The wireless reception quality information acquisition unit 110 may acquire and store wireless reception quality information at preset time intervals, may acquire and store wireless reception quality information upon detecting a predetermined trigger (e.g., the wireless reception quality varying by a certain threshold or more), or may acquire and store wireless reception quality information at a timing other than them.

The terminal information acquisition unit 120 acquires terminal information such as the model name of the user terminal 100 and stores it in the terminal information storage unit 150 with addition of the date and time of acquisition.

In the example shown in FIG. 3, the wireless reception quality information acquisition unit 110 and terminal information acquisition unit 120 are shown as being functions of an OS standard API of the user terminal 100; however, use of an OS standard API is an example.

The NW quality information acquisition unit 130 performs a ping measurement at arbitrary time intervals to acquire a round trip time (RTT) and stores the acquired RTT in the NW quality information storage unit 160 with the date and time of acquisition. Destination of the ping is a device provided on the network (a server, a router, etc.), for example. The NW quality information acquisition unit 130 also performs DL throughput measurement on a regular basis and stores the result of measurement in the NW quality information storage unit 160 with the date and time of acquisition.

The quality information transmission unit 170 transmits the information stored in the respective storage units to the quality information collection device 310.

In the example shown in FIG. 3, the NW quality information acquisition unit 130, the wireless reception quality information storage unit 140, the terminal information storage unit 150, and the NW quality information storage unit 160 are functional units that are embodied by a specially designed application pre-installed in the user terminal 100. This is merely an example, however.

FIG. 5 shows a configuration of the base station 200 in addition to the configuration of the user terminal 100 (the storage units are omitted). FIG. 5 also shows flows of information between the user terminal 100/the base station 200 and the quality estimation system 300. FIG. 6 shows acquisition items of base station information.

As shown in FIG. 5, the base station 200 includes a base station information acquisition unit 210 and a quality information transmission unit 220. The base station information acquisition unit 210 acquires the transmission schemes (CA, QAM, MIMO, etc.) supported by the base station 200 side and its own position information (latitude, longitude, etc.) as base station information. The quality information transmission unit 220 transmits base station information added with the date and time of acquisition to the quality information collection device 310.

The terminal information, wireless reception quality information and NW quality information acquired by the user terminal 100 and base station information acquired by the base station 200 are transmitted to the quality information collection device 310 periodically or when there is a request from the quality management device 320.

Configurations of Quality Information Collection Device 310 and Quality Management Device 320

Figure 7:
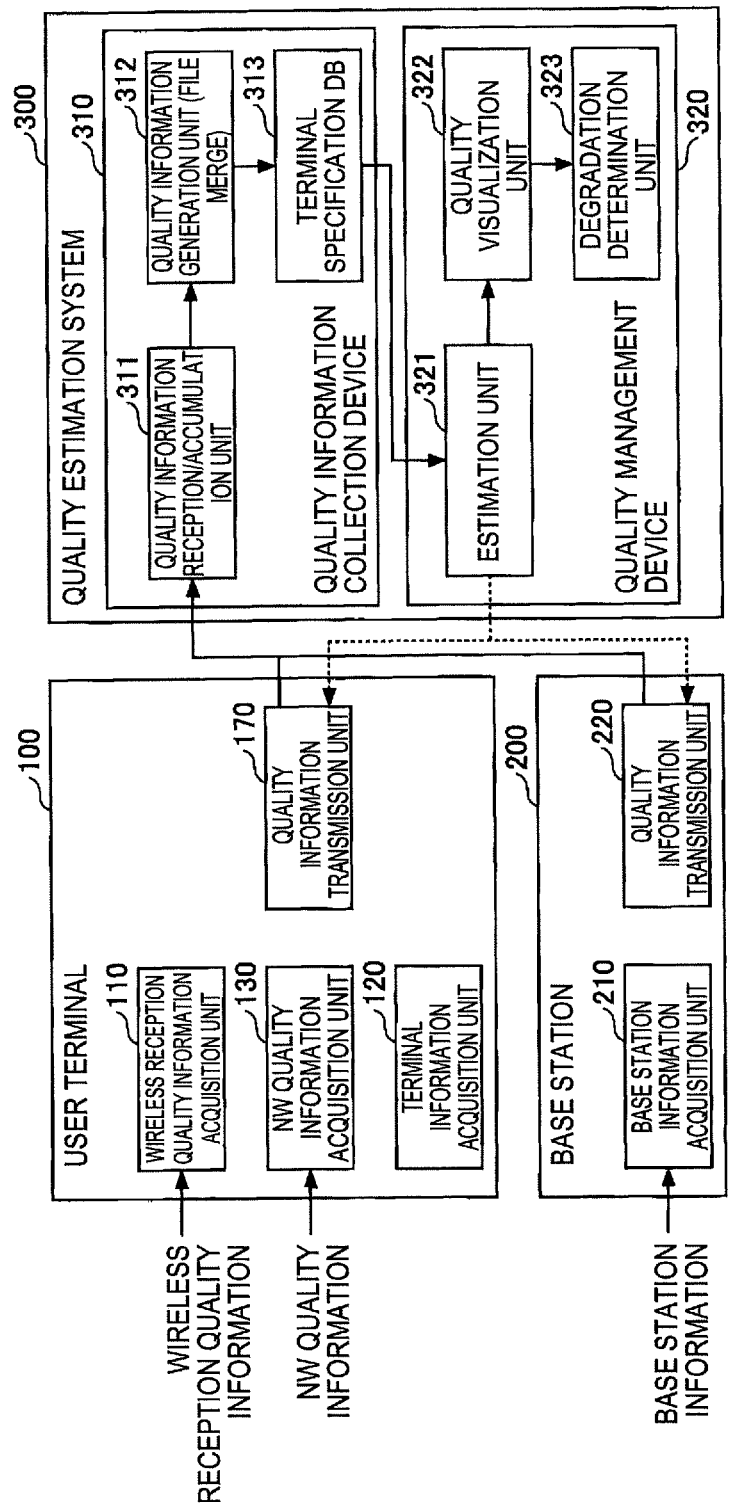
FIG. 7 shows configurations of the user terminal 100, the base station 200, a quality information collection device 310 and a quality management device 320.

FIG. 7 shows configurations of the quality information collection device 310 and the quality management device 320, in addition to the configurations of the user terminal 100 and the base station 200.

As shown in FIG. 7, the quality information collection device 310 includes a quality information reception/accumulation unit 311, a quality information generation unit 312, and a terminal specification DB 313. The quality management device 320 includes an estimation unit 321, a quality visualization unit 322, and a degradation determination unit 323. Operations of the functional units of the quality information collection device 310 and the quality management device 320 are discussed later.

While this embodiment is described with reference to a case where the quality information collection device 310 and the quality management device 320 are provided and they constitute the quality estimation system 300, such sectioning is an example. For example, the quality information collection device 310 and the quality management device 320 may be embodied in a single device. Such a device when the quality information collection device 310 and the quality management device 320 are embodied in a single device may also be called a quality estimation system.

Exemplary Hardware Configuration

The devices in this embodiment (the user terminal 100, the base station 200, the quality information collection device 310, the quality management device 320 and the quality estimation system) can each be embodied by causing a computer to execute a program describing the content of processing described in this embodiment, for example. The "computer" may be a virtual machine provided by a cloud service. When a virtual machine is used, the "hardware" described herein refers to virtual hardware.

Each device can be embodied by execution of a program corresponding to the processing performed in the device by means of hardware resources such as a CPU and memories contained in the computer. The program can be recorded on a computer readable recording medium (such as a removable memory) to be saved or distributed. It is also possible to provide the program over a network, such as via the Internet or electronic mail.

Figure 8:
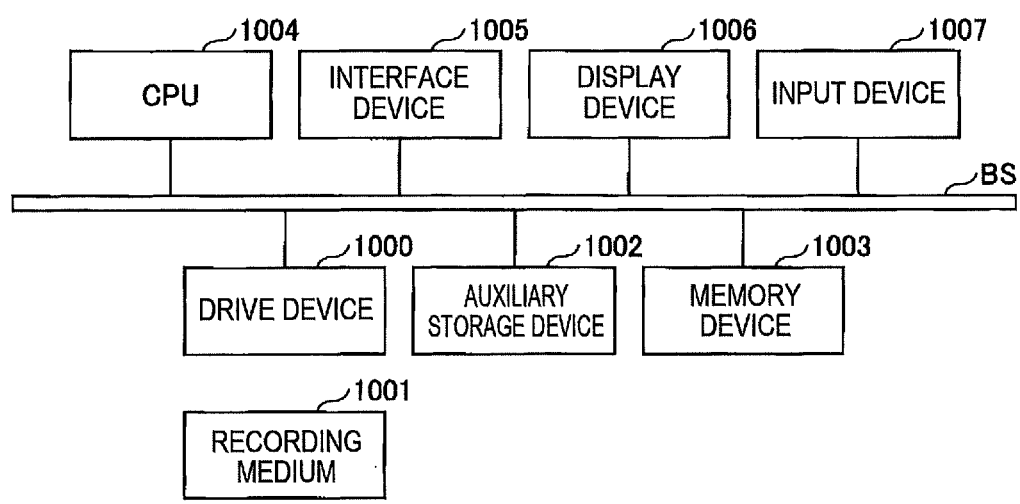
FIG. 8 shows an example of hardware configuration of each device.

FIG. 8 shows a hardware configuration of the computer in this embodiment. The computer in FIG. 8 has a drive device 1000, an auxiliary storage device 1002, a memory device 1003, a CPU 1004, an interface device 1005, a display device 1006, and an input device 1007, which are interconnected by a bus B.

The program to embody processing in the computer is provided through a recording medium 1001 such as a CD-ROM or a memory card, for example. When the recording medium 1001 storing the program therein is set in the drive device 1000, the program is installed into the auxiliary storage device 1002 from the recording medium 1001 via the drive device 1000. However, the program needs not necessarily installed from the recording medium 1001; it may be downloaded from another computer via a network. The auxiliary storage device 1002 stores the installed program and also stores necessary files, data, etc.

The memory device 1003 loads and stores the program from the auxiliary storage device 1002 upon an instruction to activate the program. The CPU 1004 embodies the functions associated with the device in accordance with the program stored in the memory device 1003. The interface device 1005 is used as an interface for connecting to a network. The display device 1006 displays a GUI (Graphical User Interface) based on the program and the like. The input device 1007 is composed of a keyboard and a mouse, buttons, touch panel and the like, and is used for inputting various operational instructions.

Operations of the Functional Units of Quality Information Collection Device 310

The quality information reception/accumulation unit 311 of the quality information collection device 310 shown in FIG. 7 receives and accumulates various kinds of information transmitted from the user terminals 100 and the base stations 200 (terminal information, wireless reception quality information, NW quality information, base station information, etc.).

The quality information generation unit 312 associates all or some of the terminal information, the wireless reception quality information, the NW quality information, the base station information, and the date and time of acquisition, and generates a file having the associated information. The generated file is input to the terminal specification DB 313.

The terminal specification DB 313 has an accumulating function of storing information and functions of classifying information and the like.

Figure 9:
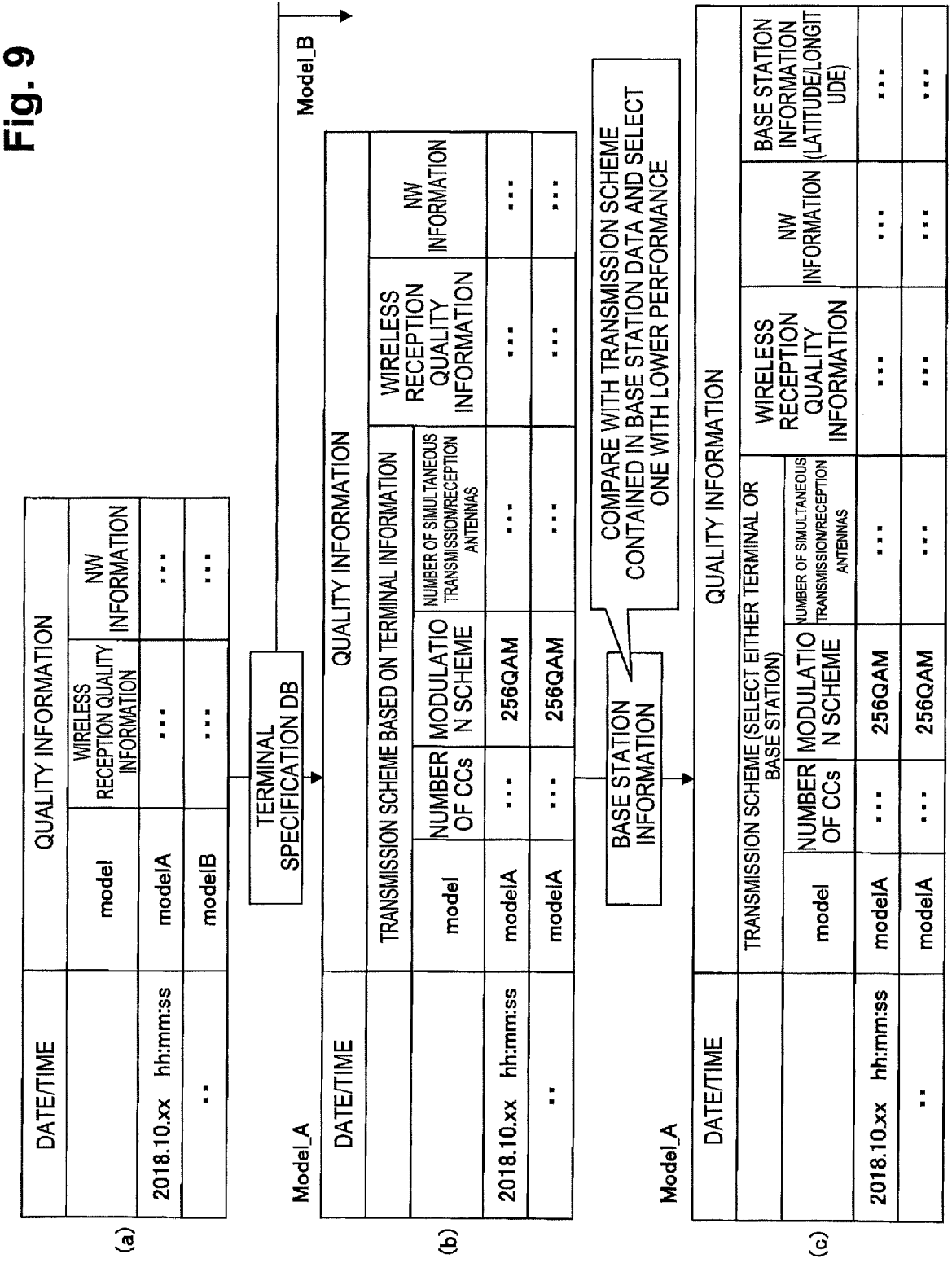
FIG. 9 is a diagram for describing information stored in a terminal specification DB 313.

FIG. 9 shows an example of processing performed by the terminal specification DB 313. The terminal specification DB 313 first performs classification of input information by model. In the example of FIG. 9, information is classified into information for Model_A and information for Model_B.

Then, the terminal specification DB 313 adds the transmission schemes (CA, QAM, MIMO, etc.) associated with each model to data on that model. In the example of FIG. 9, information on the transmission scheme (the number of CCs, the modulation scheme, the number of simultaneous transmission/reception antennas) is added as shown in (b). Information on the transmission scheme associated with the model (CA, QAM, MIMO, etc.) may be previously saved in the terminal specification DB 313, may be acquired from an external server and the like, or may be contained in terminal information transmitted from the user terminal 100.

When the quality information collection device 310 has acquired information on the transmission scheme as base station information of a base station 200 that performs communication with a user terminal 100, it selects and adds one with lower performance between information on the transmission scheme of the user terminal 100 and information on the transmission scheme of the base station 200. By way of example, given that the number of CCs supported by a user terminal 100 is 2 and the number of CCs supported by the base station 200 that communicates with the user terminal 100 is 4, the terminal specification DB 313 adds "2" as information on the number of CCs for the user terminal 100.

When the position information of the base station is present as base station information, that position information is added as the base station information associated with terminal information as shown in FIG. 9(c).

Information to be added is not limited to the information mentioned above and information such as maximum reception speed may be added, for example.

Operations of Functional Units of Quality Management Device 320

Estimation Unit 321

The estimation unit 321 uses information acquired from the terminal specification DB 313 to derive coefficient $b_i$ (i=0 to p) of an estimation equation for linear multiple regression analysis ($y=b_0x_0+b_1x_1+\ldots+b_{p-1}x_{p-1}+b_p$) as an example, and estimates the DL throughput using the estimation equation for linear multiple regression analysis with application of the derived coefficients (which may be called a model). In the equation above, y is an objective variable, which is DL throughput in this embodiment. The value $x_i$ (i=0 to p−1) is an explanatory variable, which can be wireless reception quality information, NW quality information and the like.

The way of estimating a model is not limited to linear multiple regression analysis. Any machine leaning approach, such as support vector machine, neural network, decision tree and random forest, may be applied.

Processing performed by the estimation unit 321 is now described in more detail.

The processing performed by the estimation unit 321 includes two patterns: pattern 1, in which the respective coefficients are derived after classification into models or transmission schemes, and pattern 2, in which coefficients are derived with additional use of terminal information (parameter values based on the transmission scheme, such as the number of supported CCs) (+ base station information) as explanatory variables. The estimation unit 321 may carry out either one or both of pattern 1 and pattern 2. Here, the "(+ base station information)" above is intended to mean using the one with lower performance between information on the transmission scheme of the base station and information on the transmission scheme of the user terminal, using the position information of the base station or the like as mentioned above.

The content of processing in each pattern is described below.

(1) Pattern 1

In pattern 1, the estimation unit 321 computes the DL throughput using a function in which the DL throughput is the objective variable and wireless reception quality information (RSRP, RSRQ, RSSNR) and NW quality information (RTT) are explanatory variables.

More specifically, the estimation unit 321 first classifies data read from the terminal specification DB according to model or transmission scheme, and for each classification, determines the coefficient for each type of quality information by linear multiple regression analysis using the DL throughput, wireless reception quality information (RSRP, RSRQ, RSSNR), and NW quality information (RTT).

Then, in computing the DL throughput, the estimation unit 321 selects coefficients based on the model or transmission scheme in question.

Figure 10:
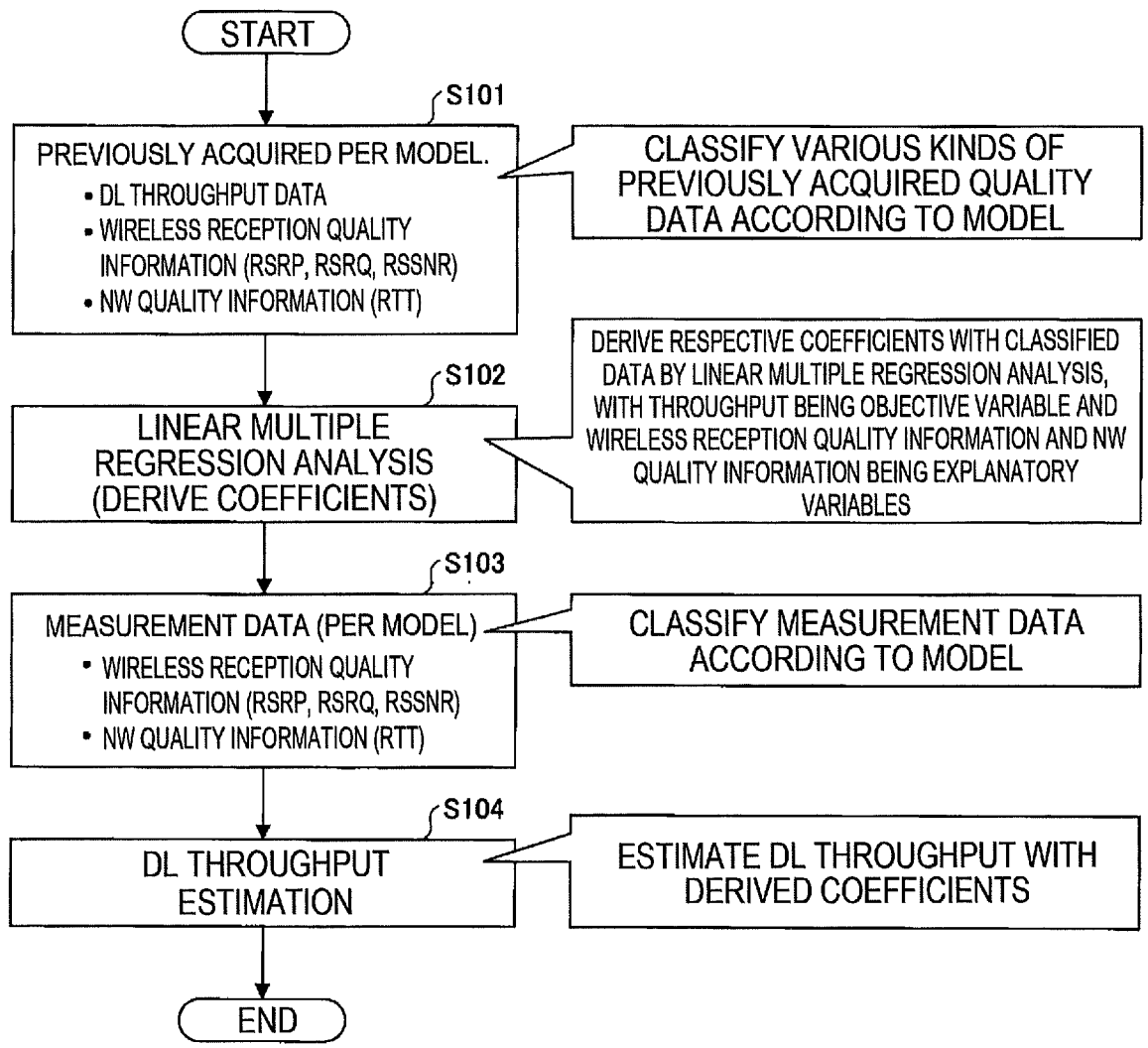
FIG. 10 is a flowchart illustrating an exemplary DL throughput estimation process 1.

FIG. 10 is a flowchart illustrating an exemplary processing as per model. At S101, the estimation unit 321 classifies previously acquired data (in this embodiment, data read from the terminal specification DB 313) according to model, and acquires data on "DL throughput, wireless reception quality information (RSRP, RSRQ, RSSNR), and NW quality information (RTT)" for each model. For example, if the model is Model_A, the estimation unit 321 acquires multiple data on the "DL throughput, wireless reception quality information (RSRP, RSRQ, RSSNR) and NW quality information (RTT)" of the Model_A. The "DL throughput, wireless reception quality information (RSRP, RSRQ, RSSNR) and NW quality information (RTT)" for one Model_A is data that was acquired from a user terminal 100 of Model_A at a certain date and time of acquisition, for example. Such data is acquired for each model.

At S102, the estimation unit 321 derives coefficients by performing linear multiple regression analysis using the data for each of the models classified at S101. For example, looking at Model_A as the model, the estimation unit 321 derives the respective coefficients using the data for Model_A by linear multiple regression analysis, with the DL throughput being the objective variable and wireless reception quality information and NW quality information being explanatory variables.

S103 and S104 are processing for estimating the DL throughput from measurement data (not including DL throughput). The measurement data here is also acquired from the terminal specification DB 313. However, measurement data is not limited to those acquired from the terminal specification DB 313.

At S103, the estimation unit 321 acquires measurement data from the terminal specification DB 313 and classifies the measurement data according to model. For example, assume that "wireless reception quality information (RSRP, RSRQ, RSSNR), and NW quality information (RTT)" have been acquired as the measurement data for Model_A.

In this case, at S104, the estimation unit 321 can compute the DL throughput corresponding to the measurement data "wireless reception quality information (RSRP, RSRQ, RSSNR), and NW quality information (RTT)" for Model_A by calculating the estimation equation for linear multiple regression analysis with application of the coefficients obtained for Model_A.

Figure 11:
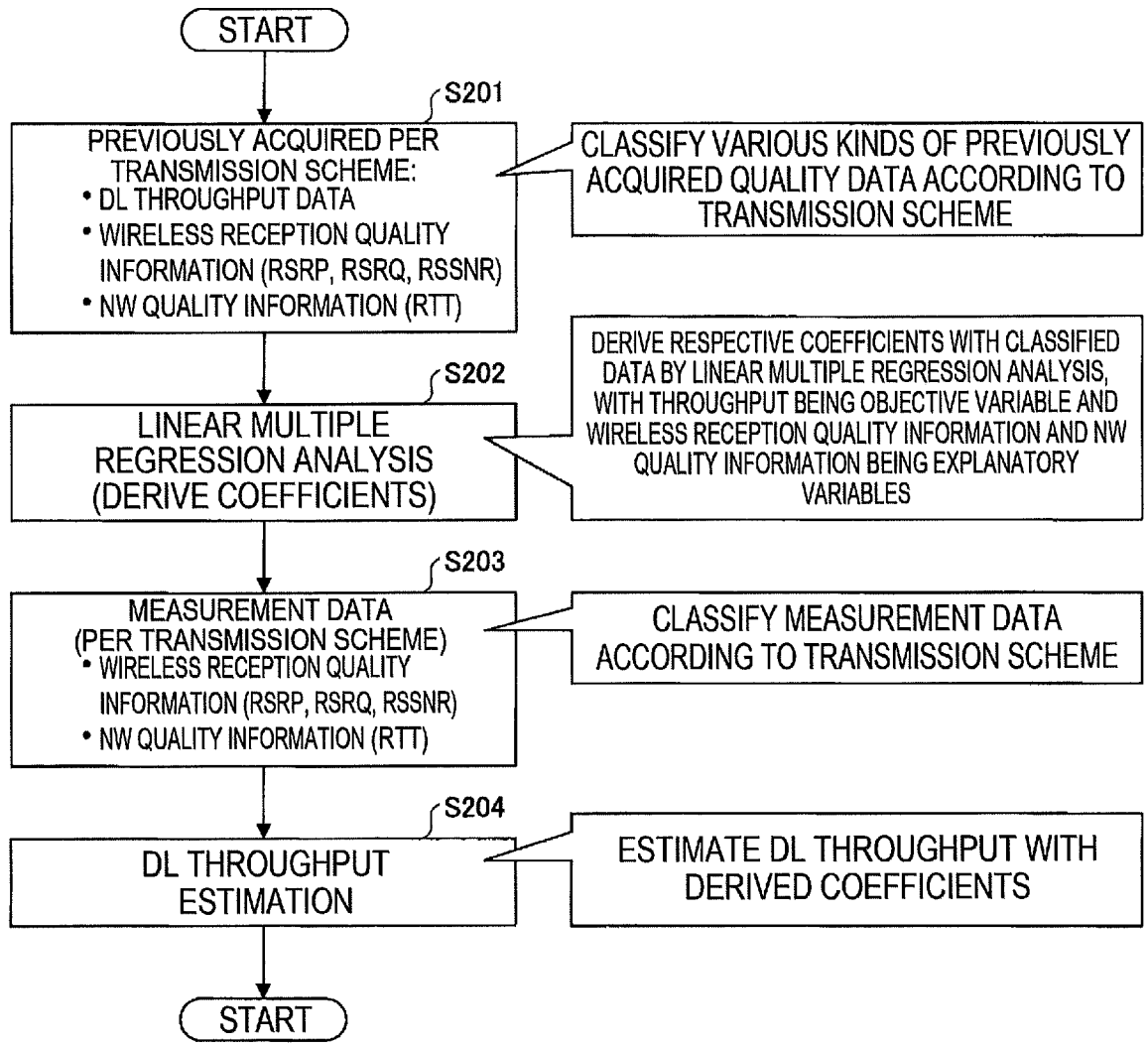
FIG. 11 is a flowchart illustrating the exemplary DL throughput estimation process 1.

FIG. 11 shows processing in the case of classification according to transmission scheme. Compared to FIG. 10, the content of processing is similar to the case of FIG. 10 except that the classification is based on the transmission scheme instead of the model.

(2) Pattern 2

In pattern 2, the estimation unit 321 computes the DL throughput using a function in which the DL throughput is the objective variable and terminal information (parameter values based on the transmission scheme, such as the number of supported CCs) (+ base station information), wireless reception quality information (RSRP, RSRQ, RSSNR) and NW quality information (RTT) are explanatory variables. More specifically, the estimation unit 321 first determines the coefficient for each type of quality information by linear multiple regression analysis using the DL throughput, and terminal information (parameter values based on the transmission scheme) (+ base station information), wireless reception quality information (RSRP, RSRQ, RSSNR) and NW quality information (RTT), which are previously acquired data (data read from the terminal specification DB). Then, in computing the DL throughput, the estimation unit 321 computes it using the estimation equation with application of the coefficients. Parameter values based on the transmission scheme, which is terminal information, can be the number of supported CCs (such as a maximum number of frequency bands that are simultaneously available in carrier aggregation (CA)), difference in the modulation scheme (such as QAM: a maximum number of bits that can be carried per transmission unit (e.g., 16 QAM=4, 64 QAM=6, 256 QAM=8)), and the number of simultaneous transmission/reception antennas (such as a minimum value of the number of transmit antennas and the number of receive antennas), for example.

For limiting the area in estimation, the position information in base station information can be utilized. For example, when estimating the DL throughput in the LTE service area A as in FIG. 2, coefficients are derived by utilizing the base station information of the LTE service area A and data on the DL throughput, terminal information, wireless reception quality information, and NW information that were acquired from the user terminals 100 under its control (in its sector). Then, the DL throughput is estimated using the estimation equation with application of the coefficients, from data on the terminal information, wireless reception quality information and NW information acquired from the user terminals 100 present in the LTE service area A.

It is also possible to designate a time period by utilizing the date and time associated with each quality information. For example, coefficients can be derived by utilizing data on the DL throughput, terminal information, wireless reception quality information and NW information that were acquired at a certain date and time, and the DL throughput can be estimated using the estimation equation with application of the coefficients, from data on the terminal information, wireless reception quality information, NW information that were acquired from user terminals 100 at that date and time.

Figure 12:
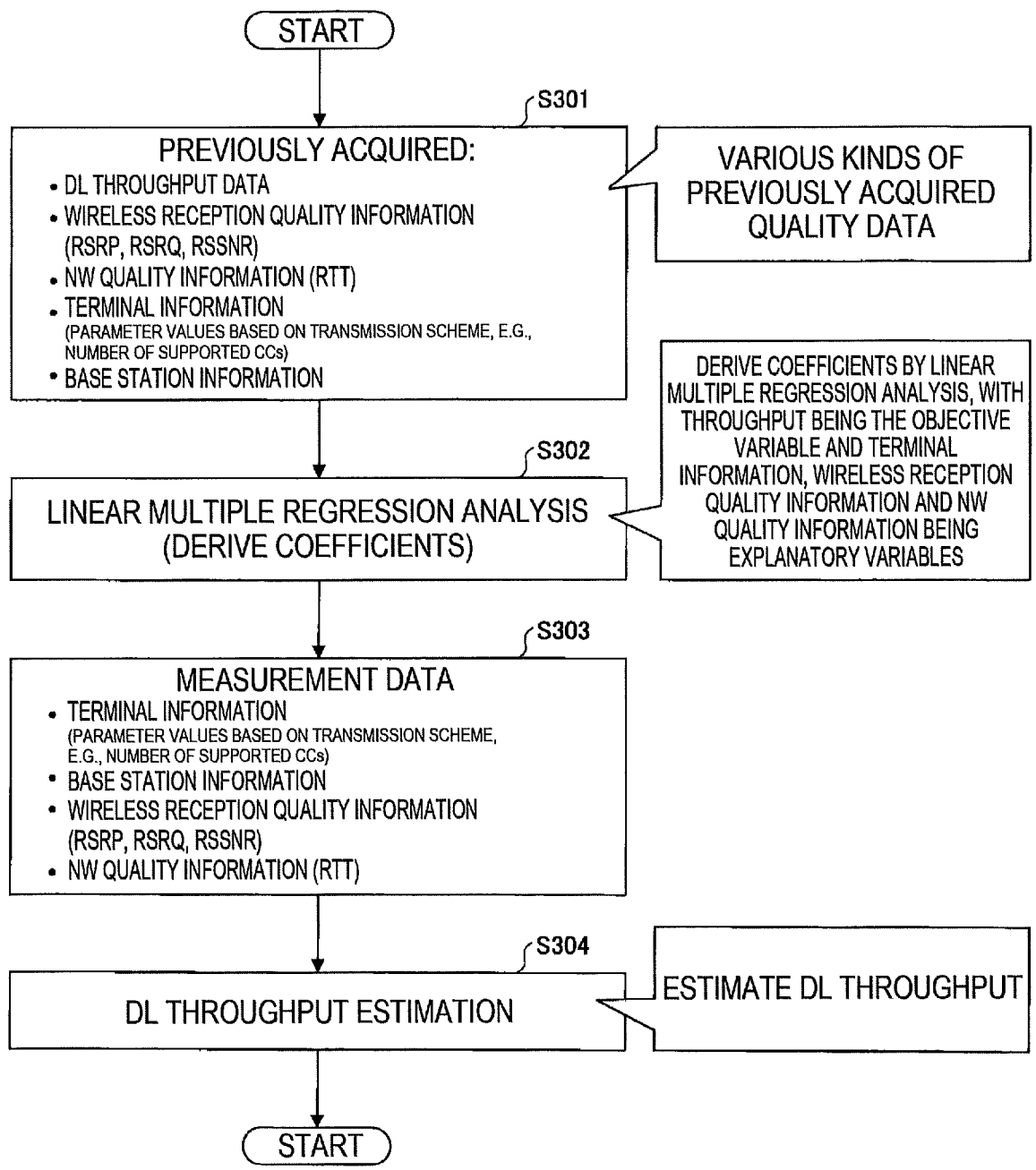
FIG. 12 is a flowchart illustrating an exemplary DL throughput estimation process 2.

FIG. 12 is a flowchart illustrating exemplary processing for pattern 2.

At S301, the estimation unit 321 acquires data on multiple pieces of "DL throughput, wireless reception quality information (RSRP, RSRQ, RSSNR), NW quality information (RTT), terminal information (parameter values based on the transmission scheme, such as the number of supported CCs) (+ base station information)" from the terminal specification DB 313.

In a case where the position information of a base station is used, if the base station is base station_A for example, a set of multiple pieces of "DL throughput, wireless reception quality information (RSRP, RSRQ, RSSNR), NW quality information (RTT), terminal information (parameter values based on the transmission scheme, such as the number of supported CCs) (+ base station information)" that are associated with the position information of base station_A is acquired. This applies to other base stations as well.

At S302, the estimation unit 321 derives coefficients by performing linear multiple regression analysis with the data acquired at S301.

In the case of using the position information of a base station, looking at base station_A as the base station for example, the estimation unit 321 derives the respective coefficients by linear multiple regression analysis using the data associated with the position information of the base station_A, with the DL throughput being the objective variable and terminal information, wireless reception quality information and NW quality information being the explanatory variables.

S303, S304 are processing for estimating the DL throughput from measurement data (not including DL throughput). The measurement data here is also acquired from the terminal specification DB 313. However, measurement data is not limited to those acquired from the terminal specification DB 313.

At S303, the estimation unit 321 acquires measurement data from the terminal specification DB 313. For example, when assuming a case where position information of base stations is used and the DL throughput in the area of base station_A is to be estimated, suppose that the "terminal information, wireless reception quality information (RSRP, RSRQ, RSSNR), and NW quality information (RTT)" associated with the position information of base station_A have been acquired as measurement data.

In this case, at S304, the estimation unit 321 can compute the DL throughput corresponding to the measurement data, "terminal information, wireless reception quality information (RSRP, RSRQ, RSSNR), NW quality information (RTT)", for the position of base station_A, by calculating a linear multiple regression analysis equation with application of the coefficients obtained using the data associated with the position information of base station_A.

Operation of Quality Visualization Unit 322

The quality visualization unit 322 visualizes the DL throughput, which is the result of estimation computed by the estimation unit 321.

Figure 13:
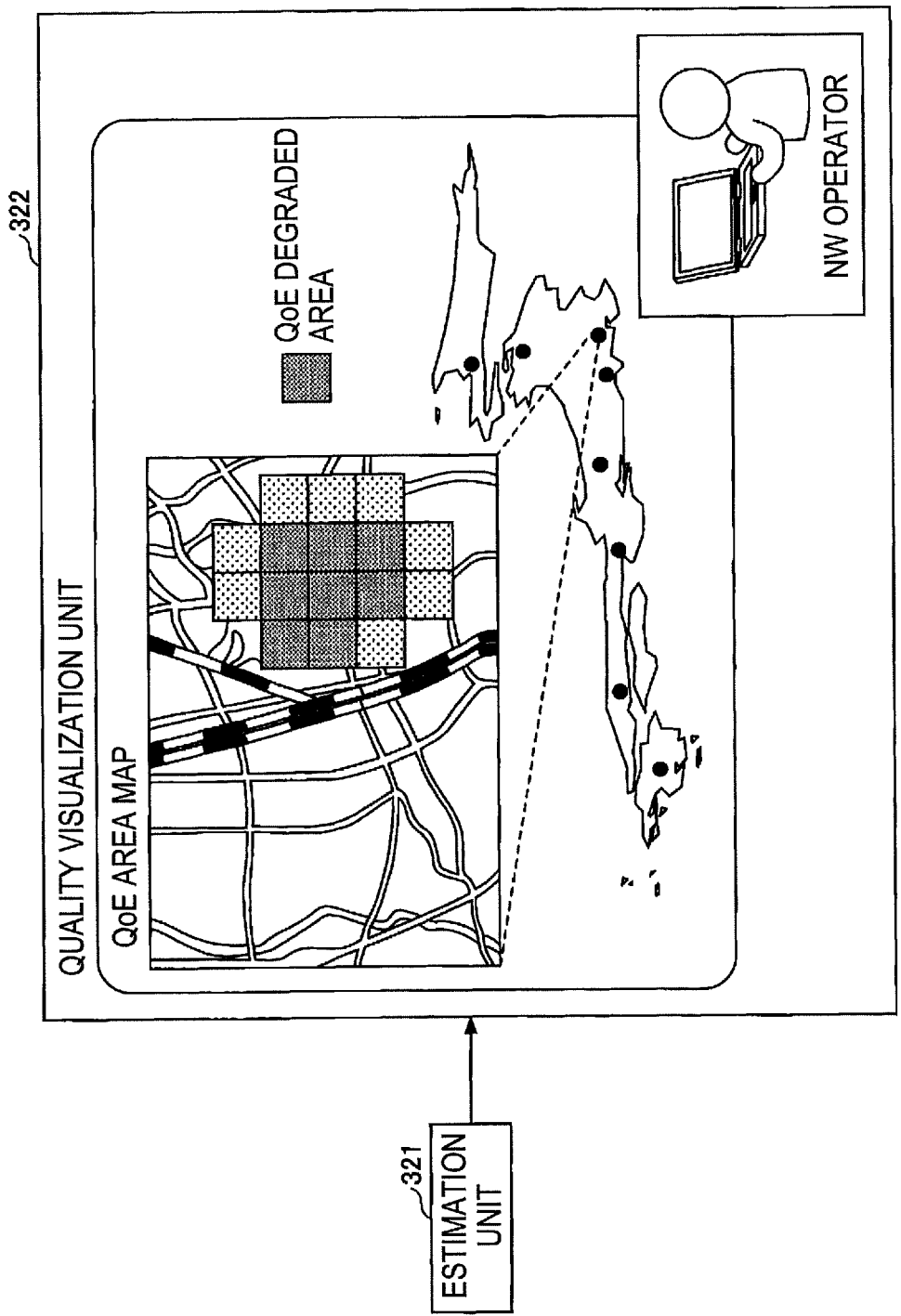
FIG. 13 is a diagram for describing processing performed by a quality visualization unit.

For example, as shown in FIG. 13, the quality visualization unit 322 generates a screen of a map (a quality area map) which maps the positions of the user terminals 100 from which measurement data were sent (or alternatively the position of the base station 200 accommodating the user terminals 100) and users' quality of experience (QoE) which is calculated based on the DL throughput obtained from the measurement data, and provides the screen to a terminal of an NW operator. This allows an NW administrator at the NW operator to visually keep track of whether QoE is degrading in each area. For the estimation of QoE from parameters such as DL throughput, a QoE estimation method described in Reference Literature ("QoE-centric operation for optimizing users' quality of experience", NTT Technical Journal, 2015. 7) can be used, for example.

Operation of Quality Degradation Determination Unit 323

Figure 14:
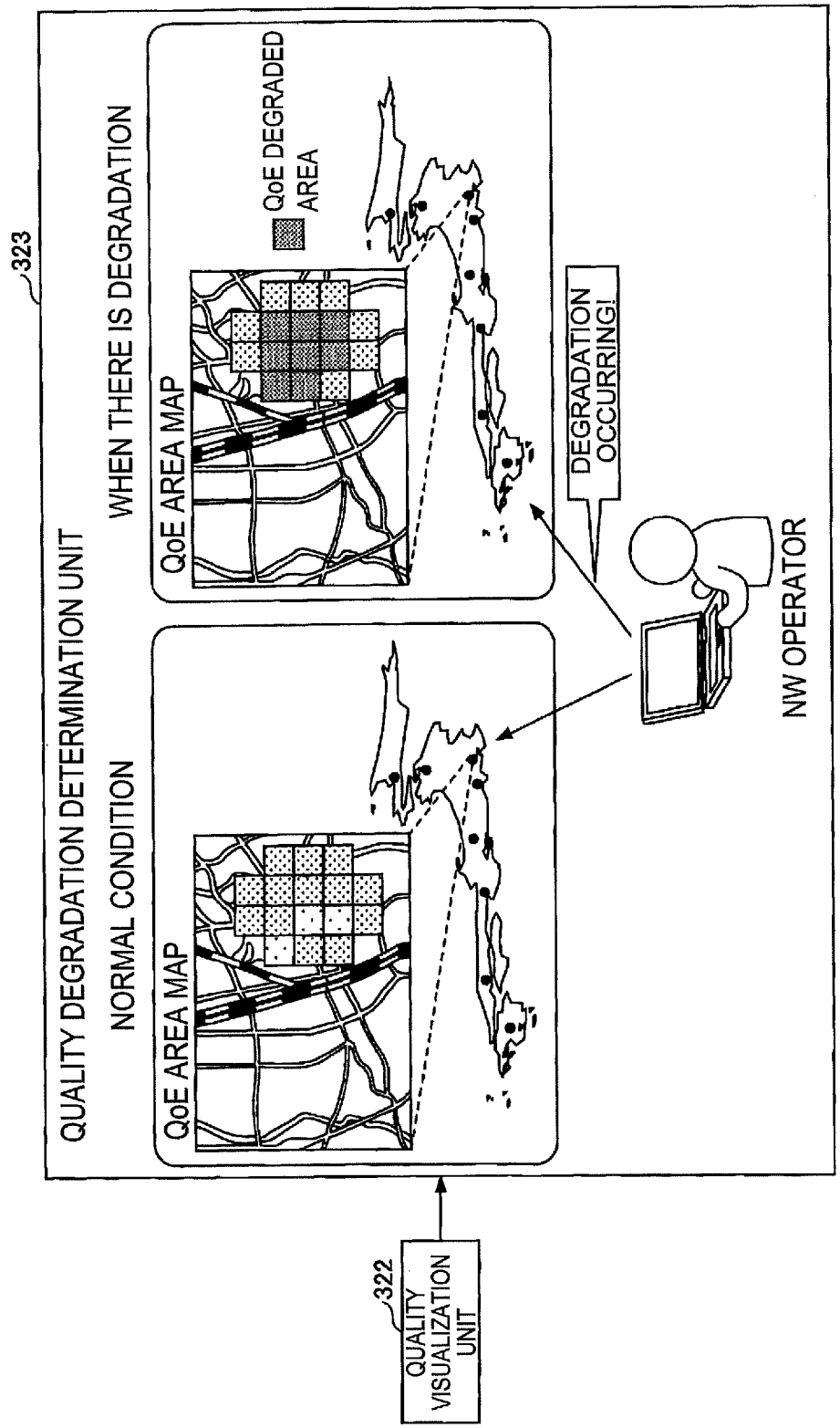
FIG. 14 is a diagram for describing processing performed by a quality degradation determination unit.

The quality degradation determination unit 323 holds the DL throughput for when there is no degradation in quality (or alternatively QoE estimated from the DL throughput) in storage means as data with no quality degradation (good quality). As shown on the left-hand side in FIG. 14, the data for no quality degradation is held as data on the map generated by the quality visualization unit 322.

Then, the quality degradation determination unit 323 determines whether the quality in question has degraded on the basis of a difference which is determined by subtracting the value of the quality in question from the value of quality for good quality. For example, if the difference is equal to or greater than a threshold, the quality degradation determination unit 323 determines that the quality has degraded. If the quality has degraded, it can be displayed as a degraded area as shown on the right-hand side in FIG. 14, for example.

Effects of the Embodiment and Others

As has been described above, in this embodiment, the quality estimation system 300 can estimate the DL throughput with high accuracy using, as input parameters, wireless reception quality information (RSRP, RSRQ, RSSNR), NW quality information (round trip time (RTT)), terminal information, and base station information collected through crowd sourcing in a mobile network.

As the DL throughput can be estimated with high accuracy as described above, the network operator can always keep track of the condition of quality and detect any degradation in quality (early detection).

Summarization of the Embodiment

As described above, at least the following items are disclosed herein.

(Item 1)

This embodiment is a quality estimation system for estimating DL throughput at user terminals which are connected to a wireless network, the quality estimation system including acquisition means, coefficient derivation means, and estimation means, mentioned below.

The acquisition means is acquisition means for acquiring at least terminal information, wireless reception quality information and network quality information from a plurality of user terminals.

The coefficient derivation means is coefficient derivation means for deriving coefficients in an estimation equation in which the DL throughput is an objective variable and at least the wireless reception quality information and the network quality information are explanatory variables, based on the information acquired by the acquisition means.

The estimation means is estimation means for estimating DL throughput corresponding to measurement data from the measurement data using the estimation equation with application of the coefficients.

The quality information collection device 310 is an example of the acquisition means. The quality management device 320 is an example of the coefficient derivation means and the estimation means.

(Item 2)

The acquisition means of the quality estimation system according to Item 1 classifies the wireless reception quality information and the network quality information according to model and according to transmission scheme based on the terminal information.

Further, the coefficient derivation means of the quality estimation system according to Item 1 derives the coefficients in the estimation equation using the wireless reception quality information and the network quality information for each classification.

Further, the estimation means of the quality estimation system according to Item 1 computes, for measurement data corresponding to a classification, the DL throughput using the estimation equation with application of coefficients corresponding to that classification.

(Item 3)

The coefficient derivation means of the quality estimation system according to Item 1 derives the coefficients in the estimation equation using the terminal information, the wireless reception quality information, and the network quality information.

(Item 4)

The coefficient derivation means of the quality estimation system according to Item 3 uses information indicative of lower performance between information on a transmission scheme at a base station and information on a transmission scheme at a user terminal as transmission scheme information in the terminal information.

(Item 5)

The acquisition means of the quality estimation system according to Item 3 or 4 acquires terminal information, wireless reception quality information and network quality information from a plurality of user terminals and acquires position information from a plurality of base stations.

Further, the coefficient derivation means of the quality estimation system according to Item 3 or 4 derives the coefficients in the estimation equation using the terminal information, the wireless reception quality information, and the network quality information, for the position information of each base station.

Further, the estimation means of the quality estimation system according to Item 3 or 4 computes, for measurement data corresponding to the position information of a base station, the DL throughput using the estimation equation with application of the coefficients corresponding to that position information.

(Item 6)

A quality estimation method according to this embodiment is a quality estimation method for execution by a quality estimation system that estimates DL throughput at user terminals which are connected to a wireless network, and includes the following three steps.

A first step is an acquisition step of acquiring at least terminal information, wireless reception quality information and network quality information from a plurality of user terminals.

A second step is a coefficient derivation step of deriving coefficients in an estimation equation in which the DL throughput is an objective variable and at least the wireless reception quality information and the network quality information are explanatory variables, based on the information acquired at the acquisition step.

A third step is an estimation step of estimating DL throughput corresponding to measurement data from the measurement data using the estimation equation with application of the coefficients.

(Item 7)

A program for causing a computer to function as the respective means of the quality estimation system according to any one of Items 1 to 5.

While a certain embodiment has been described, the present invention is not limited to the particular embodiment and different modifications and alterations are possible within the scope of the present invention as set forth in Claims.

REFERENCE SIGNS LIST

100 user terminal
110 wireless reception quality information acquisition unit
120 terminal information acquisition unit
130 NW quality information acquisition unit
140 wireless reception quality information storage unit
150 terminal information storage unit
160 NW quality information storage unit
170 quality information transmission unit
200 base station
210 base station information acquisition unit
220 quality information transmission unit
310 quality information collection device
311 quality information reception/accumulation unit
312 quality information generation unit
313 terminal specification DB
320 quality management device
321 estimation unit
322 quality visualization unit
323 degradation determination unit
300 quality estimation system
1000 drive device
1001 recording medium
1002 auxiliary storage device
1003 memory device
1004 CPU
1005 interface device
1006 display device
1007 input device

The invention claimed is:

1. A quality estimation system for estimating downlink (DL) throughput at user terminals which are connected to a wireless network, the quality estimation system comprising:
   a processor programmed to execute a process including
      acquiring at least terminal information, wireless reception quality information, and network quality information from a plurality of user terminals;
      deriving coefficients in an estimation equation in which the DL throughput is an objective variable and at least the wireless reception quality information and the network quality information are explanatory variables, based on the acquired terminal information, wireless reception quality information, and network quality information;

estimating DL throughput corresponding to measurement data from the measurement data using the estimation equation with application of the coefficients, wherein the terminal information includes transmission scheme information comprising information indicative of lower performance between information on a transmission scheme at a base station and information on a transmission scheme at a user terminal of the plurality of user terminals, and wherein the transmission scheme information is utilized in deriving the coefficients.

2. The quality estimation system according to claim 1, wherein the process executed by the processor further includes classifying the wireless reception quality information and the network quality information according to model and according to transmission scheme based on the terminal information;

the deriving includes deriving the coefficients in the estimation equation using the wireless reception quality information and the network quality information for each classification; and the estimating includes computing, for measurement data corresponding to a classification, the DL throughput using the estimation equation with application of coefficients corresponding to that classification.

3. The quality estimation system according to claim 1, wherein the acquiring includes acquiring terminal information, wireless reception quality information, and network quality information from a plurality of user terminals and acquiring position information from a plurality of base stations, the deriving includes deriving the coefficients in the estimation equation using the terminal information, the wireless reception quality information, and the network quality information, for the position information of each base station, and the estimating includes computing, for measurement data corresponding to the position information of a base station, the DL throughput using the estimation equation with application of coefficients corresponding to that position information.

4. A quality estimation method for execution by a quality estimation system that estimates downlink (DL) throughput at user terminals which are connected to a wireless network, the quality estimation method comprising:

acquiring at least terminal information, wireless reception quality information and network quality information from a plurality of user terminals;

deriving coefficients in an estimation equation in which the DL throughput is an objective variable and at least the wireless reception quality information and the network quality information are explanatory Variables, based on the acquired terminal information, wireless reception quality information, and network quality information acquired at the acquisition step;

estimating DL throughput corresponding to measurement data from the measurement data using the estimation equation with application of the coefficients, wherein the terminal information includes transmission scheme information comprising information indicative of lower performance between information on a transmission scheme at a base station and information on a transmission scheme at a user terminal of the plurality of user terminals, and wherein the transmission scheme information is utilized in deriving the coefficients.

5. A non-transitory computer-readable storage medium storing a program for causing a computer to execute a process for estimating downlink (DL) throughput at user terminals which are connected to a wireless network, the process including:

acquiring at least terminal information, wireless reception quality information and network quality information from a plurality of user terminals;

deriving coefficients in an estimation equation in which the DL throughput is an objective variable and at least the wireless reception quality information and the network quality information are explanatory variables, based on the acquired terminal information, wireless reception quality information, and network quality information;

estimating DL throughput corresponding to measurement data from the measurement data using the estimation equation with application of the coefficients, wherein the terminal information includes transmission scheme information comprising information indicative of lower performance between information on a transmission scheme at a base station and information on a transmission scheme at a user terminal of the plurality of user terminals, and wherein the transmission scheme information is utilized in deriving the coefficients.

* * * * *